United States Patent
Eida et al.

(10) Patent No.: US 6,706,349 B2
(45) Date of Patent: *Mar. 16, 2004

(54) PACKAGING CONTAINER AND METHOD THEREFOR

(75) Inventors: Masataka Eida, Toride (JP); Hajime Yamamoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,266

(22) Filed: Dec. 3, 1998

(65) Prior Publication Data

US 2003/0170411 A1 Sep. 11, 2003

(30) Foreign Application Priority Data

Dec. 9, 1997 (JP) ............................................... 9-338839

(51) Int. Cl.[7] .................... B29D 22/00; B29D 23/00; B32B 1/08; B65D 73/00; B65D 41/00
(52) U.S. Cl. .................. 428/36.6; 428/35.7; 428/36.2; 428/35.9; 428/451; 428/480; 206/484.2; 220/359.3
(58) Field of Search ................... 428/36.1, 35.2, 428/34.7, 349, 35.7, 35.9, 36.6, 480, 446, 451, 688, 689; 206/484.2; 220/359.3

(56) References Cited

U.S. PATENT DOCUMENTS

| | | | | |
|---|---|---|---|---|
| 4,673,601 A | * | 6/1987 | Lamping et al. | 252/188.28 |
| 4,908,151 A | * | 3/1990 | Inoue et al. | 252/188.28 |
| 5,122,410 A | * | 6/1992 | Lofgren et al. | 428/216 |
| 5,143,773 A | * | 9/1992 | Takuno | 428/137 |
| 5,213,858 A | * | 5/1993 | Tanner et al. | 428/34.2 |
| 5,314,561 A | | 5/1994 | Komiya | 156/244.11 |
| 5,376,424 A | * | 12/1994 | Watanabe | 428/69 |
| 5,381,172 A | * | 1/1995 | Ujita et al. | 347/86 |
| 5,387,449 A | * | 2/1995 | Kunz et al. | 428/35.4 |
| 5,415,910 A | * | 5/1995 | Knauf | 428/34.3 |
| 5,506,307 A | * | 4/1996 | Memon | 525/227 |
| 5,512,333 A | * | 4/1996 | Suskind | 427/536 |
| 5,679,421 A | | 10/1997 | Brinton, Jr. | 428/34.3 |
| 5,723,560 A | * | 3/1998 | Canich | 526/351 |
| 5,756,171 A | * | 5/1998 | Moteki et al. | 428/36.6 |
| 5,849,401 A | * | 12/1998 | El-Afandi et al. | 428/215 |
| 6,032,800 A | * | 3/2000 | Kocher | 206/459.5 |
| 6,039,892 A | * | 3/2000 | Himeshima et al. | 252/188.28 |
| 6,265,512 B1 | * | 7/2001 | Siedle et al. | 526/351 |

FOREIGN PATENT DOCUMENTS

| | | |
|---|---|---|
| DE | 4438845 | 5/1995 |
| EP | 545856 | 6/1993 |
| EP | 668157 | 8/1995 |
| EP | 806448 | 11/1997 |
| JP | 3-101945 | 4/1991 |
| JP | 3-234659 | 10/1991 |
| JP | 4-62159 | 2/1992 |
| JP | 5-8318 | 1/1993 |
| JP | 6-198909 | 7/1994 |
| JP | 6-278741 | 10/1994 |
| WO | 96/33923 | 10/1996 |

\* cited by examiner

*Primary Examiner*—Harold Pyon
*Assistant Examiner*—Michael C. Miggins
(74) *Attorney, Agent, or Firm*—Fitzpatrick, Cella, Harper & Scinto (57) ABSTRACT

A packaging container member, for containing an ink-jet head and/or an ink reservoir, includes a resin material with a composite layer deposited thereon, and an adhesive layer for sealing a containing space in a packaging container. The composite layer is composed of $SiO_2$ and/or $Al_2O_3$, and the adhesive layer is composed of a propylene resin substantially free of components of molecular weight of less than 80,000, or of a biodegradable resin.

35 Claims, 4 Drawing Sheets

PACKAGING CONTAINER AND METHOD THEREFOR

BACKGROUND OF THE INVENTION

1. Field of the Invention

The present invention relates to a packaging container member and a packaging container for containing an ink-jet cartridge and/or an ink reservoir which are otherwise easily affected by external shock, such as by vibration or through being dropped, and by evaporation of water, occurring during storage or distribution. In particular, the present invention relates to a packaging container and a member therefor which are convenient to use and can meet environmental requirements.

2. Description of the Related Art

Fragile articles are generally protected by packaging materials having a cushioning effect against shock, such as paper, corrugated cardboard, foam sheets, and plastic molded products of styrene or polyurethane foam. Such packaging materials are generally unsuitable for storing ink cartridges and ink reservoirs, because evaporation of volatile components in the ink cannot be satisfactorily controlled.

Figure 6:
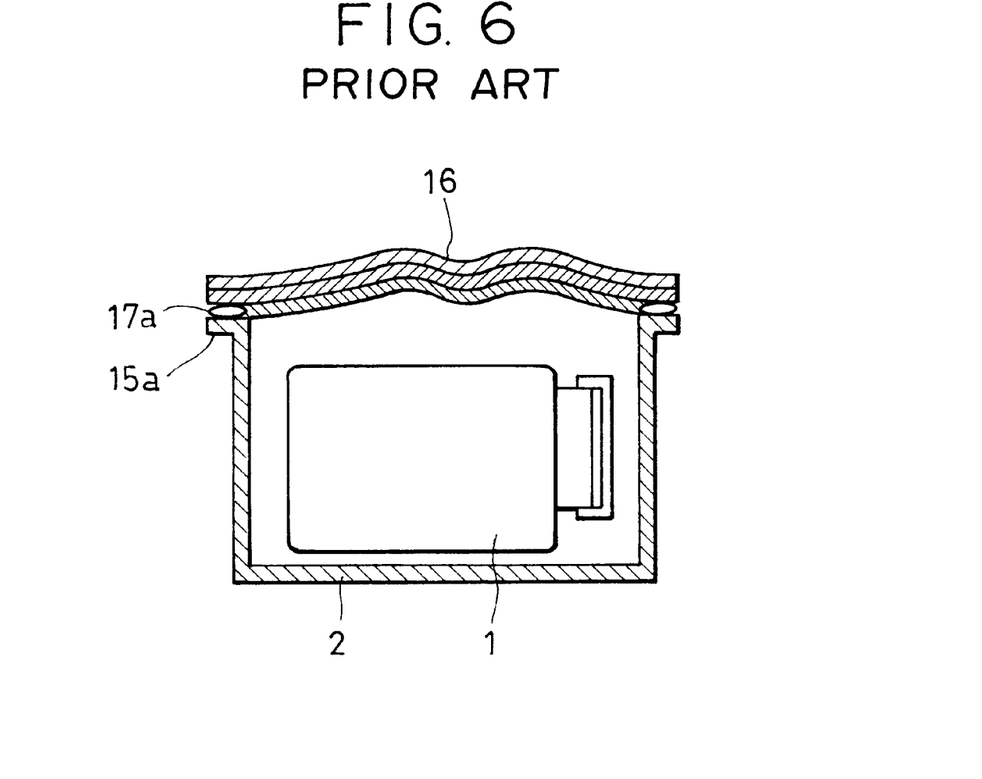
FIG. 6 is a cross-sectional view of a conventional packaging container using an aluminum composite film.
Figure 7:
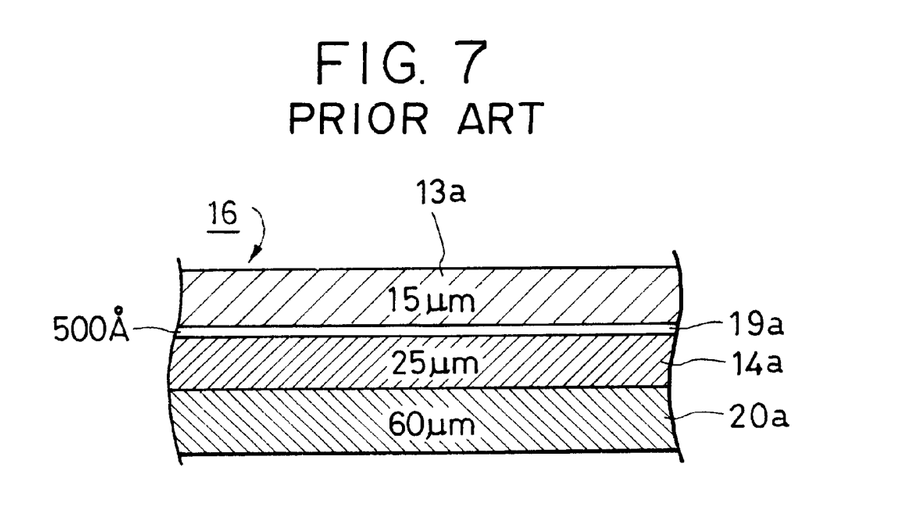
FIG. 7 is a cross-sectional view of a conventional aluminum composite film.

FIG. 6 depicts methods disclosed in Japanese Patent Laid-Open Nos. 3-101945, 3-234659 and 4-62159 for storing ink-jet cartridges or ink reservoirs, in which an ink-jet cartridge or ink reservoir 1 is placed in an indented section of a plastic molded container 2 and the indented section is sealed by heat sealing using a composite film including an aluminum layer or an aluminum-deposited composite film 16 at the heat-seal section 17a on flange 15a of the indented section. FIG. 7 is a cross-sectional view of the aluminum composite film which is composed of a polyester film 13a, an aluminum layer 19a with a thickness of 500 Å deposited on the polyester film, a plastic film 14a of nylon or polyamide, if necessary, and an adhesive layer 20a for heat sealing the composite film to form a bag or blister container.

When the cartridge or reservoir 1 is light in weight or has relatively high impact resistance, the cartridge or reservoir is packed using a packaging bag composed of a composite film 16 with an aluminum layer formed by lamination or deposition. The aluminum layer can sufficiently suppress evaporation of ink components.

In recent years, the use of films not having an aluminum layer for packaging materials has been required in view of environmental protection. Metallic aluminum used in packaging materials requires a large amount of energy, e.g. petroleum, coal and nuclear energy, in its production process, although its recycling cost is lower than that of other natural resources such as iron and resin.

The use of aluminum in a composite film with resin in packaging must be avoided in view of energy conservation because the composite film is unsuitable for recycling. Further, the aluminum composite film does not transmit light, hence the packaged article is not visible.

Packaging by a conventional resin film without an aluminum layer allows permeation of volatile components such as water and alcohol in the ink, resulting in deterioration of ink-discharging characteristics and printing characteristics due to thickening of the ink.

Although polyvinylidene chloride has low permeability to volatile components, it generates dioxin, which is generally recognized as a harmful substance that is damaging to the environment when it is disposed of by combustion. Thus, this resin is unsuitable for packaging.

The present inventors have been intensively researching a packaging container member that does not allow permeation of water vapor, does not cause environmental problems, and is translucent enough to allows the contained contents to be visible.

SUMMARY OF THE INVENTION

As a result of their research, the present inventors have discovered that a silica- or alumina-deposited composite film is translucent enough that it allows the contained contents to be visible, and further has advantages such as low permeability that are comparable to aluminum-deposited films and composite films with aluminum layers.

Accordingly, it is an object of the present invention to provide a packaging container member and a packaging container that do not allow significant permeation of water vapor and that are translucent enough to allow the contained contents to be visible.

It is another object of the present invention to provide a packaging container that can adsorb odorous gas in the container.

It is a further object of the present invention to provide a packaging container member and a packaging container that do not cause environmental problems.

A first aspect of the present invention is a packaging container member for containing at least one of an ink-jet head and an ink reservoir, the packaging container member including: a resin material with a composite layer deposited thereon, the composite layer including at least one of $SiO_2$ and $Al_2O_3$; and an adhesive layer for sealing a containing space in a packaging container, the adhesive layer including a propylene resin substantially free of components of molecular weight of less than 80,000.

A second aspect of the present invention is a packaging container member for containing at least one of an ink-jet head and an ink reservoir, the packaging container member including: a resin material with a composite layer deposited thereon, the composite layer including at least one of $SiO_2$ and $Al_2O_3$; and an adhesive layer for sealing a containing space in a packaging container, the adhesive layer including a biodegradable resin.

A third aspect of the present invention is a packaging container including one of the above-mentioned packaging container members and a packaging container body having a containing section for containing at least one of an ink-jet head and an ink reservoir, the packaging container member covering the containing section of the packaging container body, the adhesive layer bonding the packaging member to the packaging container body.

A fourth aspect of the present invention is a packaging container including a packaging bag which is composed of one of the above-mentioned packaging members sealed by the adhesive layer.

Since alumina ($Al_2O_3$) occurs naturally in the form of kaolin or hydrated aluminum silicate ($Al_2O_3 \cdot 2SiO_2 \cdot 2H_2O$), or bauxite (major components: $Al(OH)_3$ and $Al_2O_3 \cdot 2H_2O$), it can be produced without consuming a large amount of energy. Silica ($SiO_2$) also occurs naturally, hence it also can be produced without consuming a large amount of energy.

The resin material with a composite layer of $SiO_2$ and/or $Al_2O_3$ has advantages comparable to conventional aluminum-deposited films and conventional composite films with aluminum layers, when it is used in packaging containers.

The use of a biodegradable film permits the packaging container to be disposed in earth, since the film will be degraded by bacteria in the ground.

Preferably, the resin material is selected from the group consisting of polyester resins and polyolefin resins.

Preferably, the packaging container member comprises a laminate including at least two layers of resin films.

Preferably, the packaging container includes at least one of a gas adsorbent and a humectant for preventing evaporation of volatile components in an ink contained in the ink reservoir. The gas adsorbent may be wrapped with a wrapping material selected from an unwoven fabric and a film having fine pores. The humectant may contain a water-absorbable resin and may be wrapped with a wrapping material selected from an unwoven fabric and a film having fine pores. The wrapping material may be composed of the same material as that of the resin material. Preferably, the humectant is a water-containing activated charcoal.

The adsorbent adsorbs gaseous alcohol and ammonia which form in the ink-jet cartridge or the ink reservoir in the packaging container to enhance the reliability of the packaging container. The humectant maintains high humidity in the packaging container to suppress evaporation of volatile components in the ink. The use of the same material as the wrapping material and the resin material allows the packaging material to be recycled.

Permeability of water vapor is 0.005 to 0.1 g/m$^2$/24 hr for composite films with aluminum films, 2 to 10 g/m$^2$/24 hr for aluminum-deposited films, or 0.2 to 0.5 g/m$^2$/24 hr for silica- or alumina-deposited films. Thus, the silica- or alumina-deposited films can be substituted for the aluminum-deposited films in the packaging container, without significant increase in permeability in accordance with the present invention. The silica- or alumina-deposited films are comparable to the composite films with aluminum layers when they are used with a humectant, although they can also be used alone when the volatility of the ink components is low.

Further objects, features and advantages of the present invention will become apparent from the following description of the preferred embodiments with reference to the attached drawings.

DESCRIPTION OF THE PREFERRED EMBODIMENTS

Figure 1:
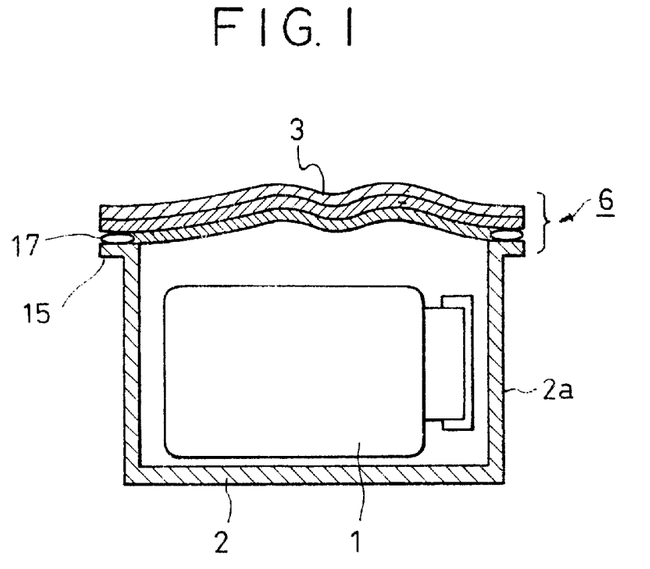
FIG. 1 is a cross-sectional view of a packaging container of an embodiment of the present invention.

FIG. 1 is a cross-sectional view of a preferred embodiment of a packaging container in accordance with the present invention. An ink-jet cartridge 1 is contained in an indented section 2a of a polypropylene blister container 2 which is formed by an injection molding or vacuum sheet forming process. The indented section 2a is covered with a lid or a packing container member 6 composed of a silica-deposited film 3. The packaging container member 6 is heat-sealed at the flange 15 of the container 2 by a heat-sealed portion 17 of an adhesive layer of the packing container member 6. Since the silica-deposited film 3 is transparent, the contents in the container are visible through the film. Further, the film 3 has high vapor barrier characteristics. Thus, the silica-deposited film 3 is suitable for a packaging container member which is used for containing an ink-jet cartridge and/or an ink reservoir.

According to the experimental results, when blister containers are allowed to stand under accelerated environmental conditions of a temperature of 60° C. and a humidity of 15% for two months, the blister container shown in FIG. 1 shows reduced water evaporation compared with a blister container using an aluminum-deposited film. The above-mentioned conditions correspond to two years in an ordinary environment (at a temperature of 25° C. and a humidity of 55%).

When the packaging container member 6 is composed of a composite film 3 formed by laminating two or more silica-deposited films, evaporation of water can be further reduced.

Figure 2:
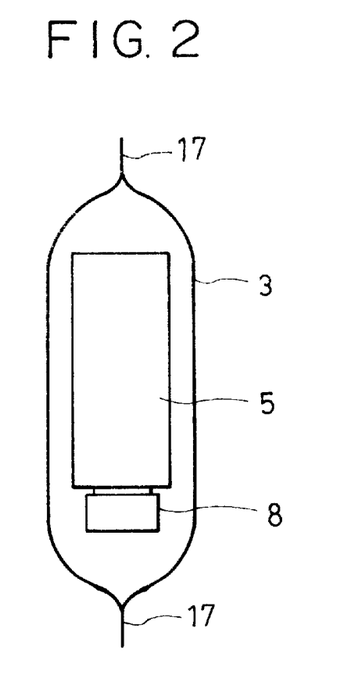
FIG. 2 is a cross-sectional view of a packaging container of another embodiment of the present invention.

FIG. 2 is a cross-sectional view of another type of packaging container. An ink reservoir 5 is contained in the packaging container which is composed of a bag formed by heat-sealing at 17 of the adhesive layer of the silica-deposited film 3. The ink reservoir 5 has a seal or cap 8 at the ink supply section. According to the accelerated evaporation test results, the packaging container also shows satisfactory vapor barrier characteristics. The contents in the packaging container are also visible hence the packaging container has superior handling characteristics.

Figure 3A:
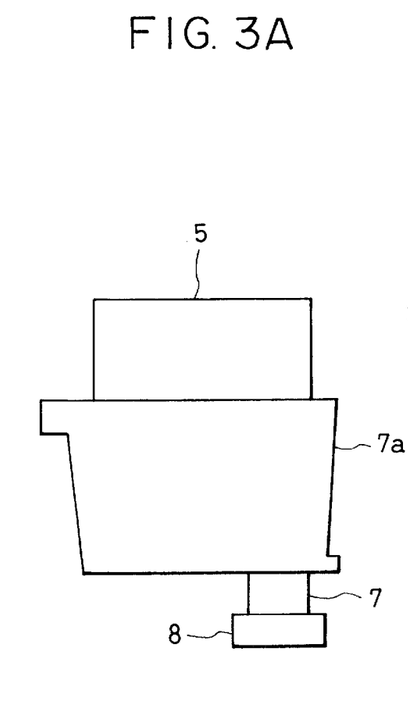
FIG. 3A is a side view of a separable ink-jet cartridge.
Figure 3B:
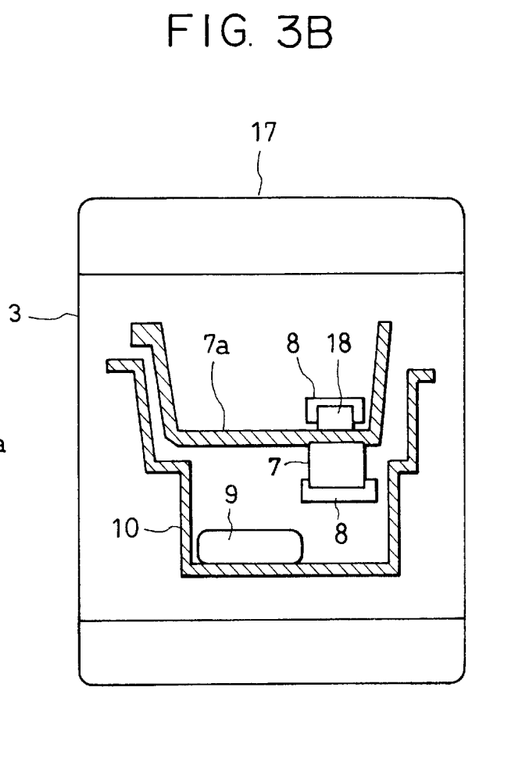
FIG. 3B is a cross-sectional view of a packaging container including a humectant of a further embodiment of the present invention.

FIG. 3B is a cross-sectional view of a packaging container containing an inner head section of a separable ink-jet cartridge in which the inner head section is detachable from an ink reservoir. FIG. 3A is a schematic side view of the separable ink-jet cartridge in which the head section is connected to the ink reservoir 5.

In this configuration, only the inner head section including a head 7 and a holder 7a is contained in the packaging container. The inner head section contains a small quantity of ink so as to facilitate flow of ink when the inner head section is connected to an ink reservoir. The volume of ink is generally in a range of 0.5 to 2 ml. In such a configuration, volatile components in the ink will rapidly evaporate, because the ink volume is small and the ink has a large free surface permitting evaporation. In order to prevent evaporation of the ink during handling and transport, the nozzle of the head and the ink-feeding pipe 18 are covered with caps 8. Since these caps are removable to permit use of the head section, sealing by the caps is incomplete. Thus, the ink in the head section may be completely dried due to evaporation of the volatile components.

With reference to FIG. 3B, a humectant 9 is placed in the packaging container in this embodiment to suppress evaporation of volatile components in the ink during long periods of handling and transport. Thus, the ink head shows high reliability for long periods. A cushion 10 is placed in the packaging container to protect the head from shock. These contents are wrapped with a silica-deposited film 3.

According to the experimental results, the ink head was allowed to stand at a temperature of 60° C. and a humidity of 15% for two months and then was mounted in a printer.

Ink was satisfactorily supplied from an ink reservoir through the ink head during printing operations. When the humectant 9 was not contained in the packaging container, approximately 50% of printed characters were difficult to read, although an ink obstruction was removed by a standard recovery operation of the printer. Thus, in the packaging container in this embodiment, slight ink obstruction due to evaporation of the volatile components may occur only at the nozzle section when the humectant is not contained, and the obstruction can be easily removed by a standard recovery operation.

In the packaging of the separable ink-jet cartridge containing a significantly small amount of ink, a combination of a humectant and a silica-deposited film can effectively reduce evaporation of volatile components in the ink while maintaining visibility of the contents through the package.

The humectant 9 may be a laminate of an unwoven fabric and a polyester film with a thickness of 15 $\mu$m or a laminate of a polyethylene with a thickness of 15 $\mu$m and vinyl acetate, wherein the laminate contains water. Alternatively, the humectant 9 may be a water-absorbable polymer wrapped with an unwoven fabric or a water-containing activated charcoal wrapped with an unwoven fabric.

When a polyester or polyethylene film with a thickness of 30 $\mu$m or more is used, there is insufficient evaporation of water from the film as compared with that from the head, resulting in drying of the head. If a humectant is used, therefore, the materials and configuration of the humectant must be selected with great care. When a polyester film is used for the silica-deposited film, it is preferable that the wrapping material for the humectant also be polyester in view of recycling.

Figure 4:
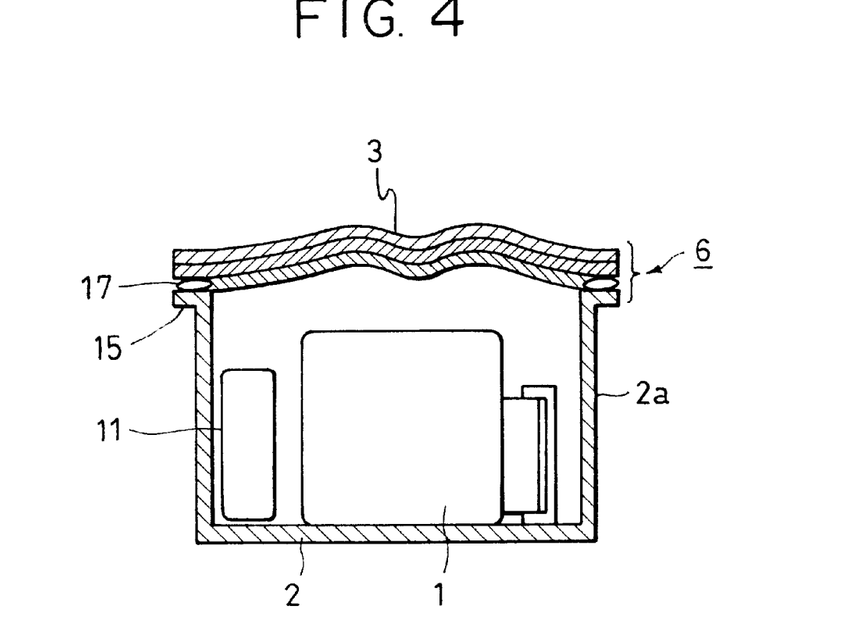
FIG. 4 is a cross-sectional view of a packaging container including a gas adsorbent of a further embodiment of the present invention.

FIG. 4 is a cross-sectional view of a packaging container that contains a gas adsorbent 11. The gas adsorbent 11 adsorbs gas formed by evaporation or modification of the volatile components in the ink. Ink generally contains urea to prevent thickening of the ink. Some types of ink contain isopropyl alcohol. Urea decomposes to form ammonia and carbon dioxide when it is allowed to stand in a severe environment, that is, a high temperature of 40° C. or more, for a long time. Ammonia accumulated in the packaging container emits a bad smell when the packaging container is opened. The gas adsorbent 11 can effectively adsorb the gas. Activated charcoal is useful as the gas adsorbent material. In particular, spherical activated charcoal X7000/X7100 made by Takeda Chemical Industries, Ltd. is effective for adsorbing carbon dioxide and other types of gas which are formed in a small amount from the sealant and adhesive used in the production of the ink-jet cartridge. The activated charcoal is preferably modified to enhance the adsorption characteristics for ammonia.

That is, the activated charcoal is pretreated to adsorb a sufficient amount of water, since non-treated activated charcoal can adsorb a large amount of water and thus causes thickening or drying of the ink. The water-containing activated charcoal does not adsorb water vapor in the packaging container but adsorbs acidic gases such as carbon dioxide and basic gases such as ammonia by substituting for the adsorbed water. In this embodiment, the water-containing activated charcoal 11 is wrapped with an unwoven fabric and contained in the packaging container. As a result, the water-containing activated charcoal 11 functions as an adsorbent for evolved gas and also as a humectant by evolution of water vapor.

Figure 5:
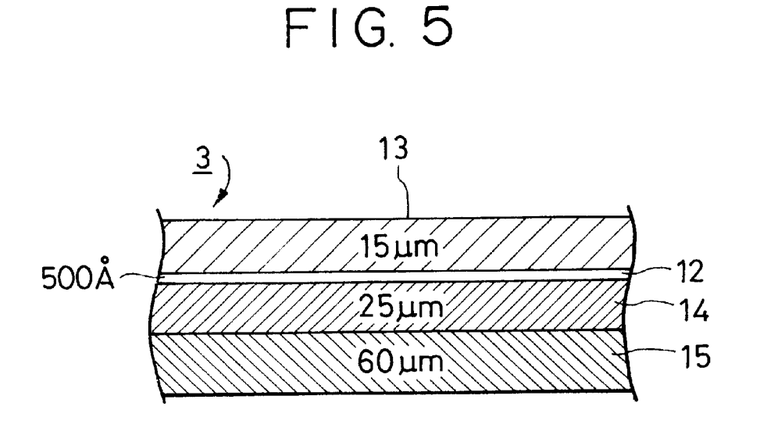
FIG. 5 is a cross-sectional view of a silica-deposited film in accordance with the present invention.

FIG. 5 is a cross-sectional view of a silica-deposited film 3. The silica-deposited film 3 is composed of a polyester film 13 and a silicon oxide layer 12 with a thickness of approximately 500 Å deposited thereon. A nylon or polyamide film 14 may be laminated thereon in order to increase the mechanical strength of the film, if necessary. Further, an adhesive layer 15 may be laminated thereon. The adhesive layer 15 is useful for heat-sealing the silica-deposited film of the blister or bag-like packaging container.

Although the adhesive layer 15 is illustrated to extend across the entirety of the film 3, it may be preferable to apply adhesive layer 15 only at areas such as 17a, which are subject to heat-sealing.

An alumina-deposited film may be used in place of the silica-deposited film in the present invention. In the alumina-deposited form, alumina or aluminum oxide is substituted for silica.

A typical example of the silica-deposited film is GL-E made by Toppan Printing Co., Ltd. and a typical example of the alumina-deposited film is GL-AE made by Toppan Printing Co., Ltd.

As described above, the silica-deposited film can be readily laminated to form a blister package or bag-like packaging container. Since it has a transmittance of 80 to 95% for visible light, it is sufficiently translucent so that the contents in the packaging container are more easily visible than those of a composite film with a metallic aluminum layer (transmittance: 0.1% or less for visible light).

With reference to FIG. 5, a conventional adhesive layer 15 is generally composed of an ethylene/vinyl acetate copolymer, low-density ethylene, or nonoriented polypropylene and is used for heat sealing of polypropylene.

The present inventors encountered the following unexpected phenomena during studies regarding evaporation of water. The opening of a polypropylene blister 2 shown in FIG. 6 is covered with an aluminum composite film 16 and the adhesive layer 20a of the aluminum composite film 16 is subjected to heat sealing at 17a. Such a packaging configuration surprisingly did not always suppress evaporation of water as expected. For comparison, evaporation of water is not substantially observed when the aluminum composite films are heat-sealed to each other, rather than being heat-sealed to a polypropylene blister.

These results suggest that evaporation of water is performed through the following three paths; (1) permeation of vapor through the film or lid 16 itself; (2) permeation through the blister 2; and (3) permeation through the heat-sealed section 17a between the lid 16 and the blister 2. According to the experimental results by the present inventors, the fraction of permeating water is approximately 5% for the lid 16 of the aluminum composite film, 47.5% for the blister 2, and 47.5% for the heat-sealed area 17a of the adhesive layer. Thus, reduction of evaporation of water through the heat-sealed area 17a of the adhesive layer would result in a packaging container having superior sealing characteristics.

Evaporation of water is presumably performed through fine passages formed in the sealing section and/or at the interface between the sealing section and the adjacent layer, even when the same material is used for the blister 2 and the adhesive layer 17. Low molecular components of polypropylene are first melted by heat and accumulated at the sealing section by the pressure during heat sealing. The phenomenon resembles accumulation of low molecular components at the weld section in a plastic molding process. The sealing section easily cracks or forms fine passages as in the welding section in the molding process. The fine passages can be often observed as fine red lines when a red liquid is dropped onto the sealing section. The fine passages are noticeable when the adhesive layer is composed of polypropylene containing polyethylene and/or a vinyl acetate copolymer.

Polypropylene that is substantially free of components of molecular weight of 100,000 or less is produced using a metallocene catalyst instead of a conventional Ziegler-Natta catalyst. The use of the metallocene catalyst eases the control of the molecular weight distribution of the polymer to be produced. When the resulting polypropylene substantially free of components of molecular weight of 100,000 or less is used as the adhesive layer, the blister packaging container of an aluminum composite film can decrease evaporation of water by 25 to 30%.

In the blister packaging container, a combination of a silica-deposited film and a polypropylene resin substantially free of low molecular components can decrease evaporation of water by approximately 10% as compared to a reference using aluminum composite film. The polypropylene resin used as the adhesive layer has a lowest molecular weight component of 80,000 to 150,000 and a major component of 500,000 to 600,000. Thus, a combination of a polypropylene resin substantially free of components of molecular weight of less than 80,000 and a silica-deposited film allows production of packaging containers having more effectively reduced evaporation of volatile components in the ink as compared to that of containers using conventional aluminum composite films. When components of low molecular weight of 10,000 to 30,000 are deliberately added to a polypropylene resin of molecular weight of 80,000 to 150,000, evaporation of water through the adhesive layer of the mixed resin increases. An alumina-deposited film also has similar advantages.

Although the vapor barrier characteristics of a silica-deposited film using polypropylene is lower than that using polyester, it is substantially equal to that of an aluminum-deposited film on polypropylene, that is, the film has a permeability of 5 to 10 g/m$^2$/24 hr. This is because polypropylene has a low melting point, making it not durable to a long-period silica deposition. The upper limit of the thickness of the silica layer is approximately 200 Å according to the UV transmittance.

The vapor barrier characteristics of a silica-deposited film using a polylactic acid type of lower polyester is lower than that using polyester, but is substantially equal to that of an aluminum-deposited film on a polylactic acid type of lower polyester, that is, the film has a permeability of 5 to 10 g/m$^2$/24 hr. A polylactic acid type of polyester film made by Mitsui Chemicals, Inc. is used in this embodiment.

Another example of a biodegradable composite film is a laminate of the silica-deposited polylactic acid film and a lower polyester film made by, for example, Show a High-polymer Co., Ltd. This lower polyester film melts at approximately 60° C. and is useful as an adhesive layer of heat sealing.

Evaporation of water from an ink reservoir contained in a packaging container using the silica-deposited biodegradable film is substantially equal to that using an aluminum-deposited film at ordinary humidity and temperature. Thus, this packaging container can serve for practical use.

Adhesion characteristics do not vary at 30° C. or less. Thus, the packaging container has sufficiently high vapor barrier characteristics in an ordinary environment. Slight separation by softening is observed at a temperature of higher than 35° C., and adhesion characteristics rapidly decrease due to softening or melting of the adhesion layer at a temperature of higher than 45° C. However, these temperatures are unlikely in ordinary environments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A packaging container member for forming part of a packaging container in which at least one of an ink-jet head and an ink reservoir, with ink being stored inside said ink-jet head and said ink reservoir, are containable, said packaging container member comprising:

a resin material with a composite layer deposited thereon, said composite layer comprising at least one of $SiO_2$ and $Al_2O_3$, and with an adhesive layer for sealing a containing space in the packaging container, said adhesive layer comprising a propylene resin substantially free of components of molecular weight of less than 80,000 and having a major component of molecular weight of about 500,000 to 600,000, wherein evaporation through the adhesive layer of a component of ink stored inside said ink jet head and said ink reservoir is reduced.

2. A packaging container member according to claim 1, wherein said resin material is selected from the group consisting of polyester resins and polyolefin resins.

3. A packaging container member according to claim 1, wherein said adhesive layer extends across an entirety of said resin material.

4. A packaging container comprising a packaging container member according to claim 1 and a packaging container body including a containing section for containing at least one of an ink-jet head and an ink reservoir, said packaging container member covering the containing section of said packaging container body, said adhesive layer bonding said packaging container member to said packaging container body.

5. A packaging container comprising a packaging bag comprising a packaging container member according to claim 1 sealed by said adhesive layer.

6. A packaging container according to either claim 4 or 5, wherein said packaging container member comprises a laminate including at least two layers of resin films.

7. A packaging container according to either claim 4 or 5, wherein said resin material is a biodegradable polyester resin.

8. A packaging container according to either claim 4 or 5, wherein said packaging container includes at least one of a gas adsorbent and a humectant for preventing evaporation of volatile components in an ink contained in said ink reservoir.

9. A packaging container according to claim 8, wherein said gas adsorbent is wrapped with a wrapping material selected from an unwoven fabric and a film having fine pores.

10. A packaging container according to claim 9, wherein the wrapping material is composed of the same material as that of the resin material.

11. A packaging container according to claim 8, wherein said humectant contains a water-absorbable resin and is wrapped with a wrapping material selected from an unwoven fabric and a film having fine pores.

12. A packaging container according to claim 11, wherein the wrapping material is composed of the same material as that of said resin material.

13. A packaging container according to claim 11, wherein said humectant is a water-containing activated charcoal.

14. A packaging container comprising:
a packaging container body including a containing section for containing at least one of an ink-jet head and an ink reservoir, with ink being stored inside said ink-jet head and said ink reservoir; and
a packaging container member for covering the containing section of said packaging container body, said packaging member comprising a resin material with a composite layer deposited thereon, said composite layer comprising at least one of $SiO_2$ and $Al_2O_3$, and with an adhesive layer for sealing a containing space in the packaging container, said adhesive layer comprising a propylene resin free of components of molecular weight of less than 80,000 and having a major component of molecular weight of about 500,000 to 600,000,
said adhesive layer bonding said packaging container member to said packaging container body, wherein evaporation through the adhesive layer of a component of ink stored inside said ink jet head and said ink reservoir is reduced.

15. A packaging container according to claim 14, wherein said packaging container member comprises a laminate including at least two layers of resin films.

16. A packaging container according to claim 14, wherein said resin material is a biodegradable polyester resin.

17. A packaging container member according to claim 14, wherein said resin material is selected from the group consisting of polyester resins and polyolefin resins.

18. A packaging container member according to claim 14, wherein said adhesive layer extends across an entirety of said resin material.

19. A packaging container according to claim 14, wherein said packaging container includes at least one of a gas adsorbent and a humectant for preventing evaporation of volatile components in an ink contained in said ink reservoir.

20. A packaging container according to claim 19, wherein said gas adsorbent is wrapped with a wrapping material selected from an unwoven fabric and a film having fine pores.

21. A packaging container according to claim 20, wherein the wrapping material is composed of the same material as that of the resin material.

22. A packaging container according to claim 19, wherein said humectant contains a water-absorbable resin and is wrapped with a wrapping material selected from an unwoven fabric and a film having fine pores.

23. A packaging container according to claim 22, wherein the wrapping material is composed of the same material as that of said resin material.

24. A packaging container according to claim 22, wherein said humectant is a water-containing activated charcoal.

25. A packaging container comprising:
a packaging bag in which at least one of an ink-jet head and an ink reservoir, with ink being stored inside said ink-jet head and said ink reservoir, are containable, said packaging bag comprising
a resin material with a composite layer deposited thereon, said composite layer comprising at least one of $SiO_2$ and $Al_2O_3$, and with an adhesive layer for sealing a containing space in the packaging container, said adhesive layer comprising a propylene resin free of components of molecular weight of less than 80,000 and having a major component of molecular weight of about 500,000 to 600,000,
wherein said packaging bag is sealed by said adhesive layer, wherein the formation of cracks in the adhesive layer is reduced and wherein evaporation through said cracks in the adhesive layer of a component of ink stored inside said ink jet head and said ink reservoir is reduced.

26. A packaging container according to claim 25, wherein said packaging container member comprises a laminate including at least two layers of resin films.

27. A packaging container according to claim 25, wherein said resin material is a biodegradable polyester resin.

28. A packaging container member according to claim 25, wherein said resin material is selected from the group consisting of polyester resins and polyolefin resins.

29. A packaging container member according to claim 28, wherein said adhesive layer extends across an entirety of said resin material.

30. A packaging container according to claim 25, wherein said packaging container includes at least one of a gas adsorbent and a humectant for preventing evaporation of volatile components in an ink contained in said ink reservoir.

31. A packaging container according to claim 30, wherein said gas adsorbent is wrapped with a wrapping material selected from an unwoven fabric and a film having fine pores.

32. A packaging container according to claim 31, wherein the wrapping material is composed of the same material as that of the resin material.

33. A packaging container according to claim 30, wherein said humectant contains a water-absorbable resin and is wrapped with a wrapping material selected from an unwoven fabric and a film having fine pores.

34. A packaging container according to claim 33, wherein the wrapping material is composed of the same material as that of said resin material.

35. A packaging container according to claim 33, wherein said humectant is a water-containing activated charcoal.

* * * * *

UNITED STATES PATENT AND TRADEMARK OFFICE
CERTIFICATE OF CORRECTION

PATENT NO.    : 6,706,349 B2
DATED         : March 16, 2004
INVENTOR(S)   : Masataka Eida et al.

It is certified that error appears in the above-identified patent and that said Letters Patent is hereby corrected as shown below:

Column 2,
Line 4, "allows" should read -- allow --.

Column 7,
Line 52, "Show a" should read -- Showa --.

Column 9,
Line 13, "packaging member" should read -- packaging container member --.

Column 10,
Line 18, "wherein the formation of cracks in the adhesive" should be deleted;
Line 19, "layer is reduced and" and "said" should be deleted; and
Line 20, "cracks in" should be deleted.

Signed and Sealed this

Twenty-first Day of September, 2004

JON W. DUDAS
*Director of the United States Patent and Trademark Office*